United States Patent
Kosaka et al.

Patent Number: 5,641,415
Date of Patent: Jun. 24, 1997

[54] METHOD OF ASSIGNING WELDING APPARATUSES IN WELDING ROBOT SYSTEM

[75] Inventors: Tetsuya Kosaka; Kouichi Ohkanda, both of Oshino-mura, Japan

[73] Assignee: Fanuc Limited, Yamanashi, Japan

[21] Appl. No.: 512,786

[22] Filed: Aug. 10, 1995

[30] Foreign Application Priority Data

Aug. 24, 1994 [JP] Japan ..................... 6-220877

[51] Int. Cl.$^6$ ..................... B23K 9/12
[52] U.S. Cl. ..................... 219/86.25; 219/125.1; 901/42
[58] Field of Search ..................... 219/125.1, 110, 219/86.25; 901/42

[56] References Cited

U.S. PATENT DOCUMENTS

| | | | |
|---|---|---|---|
| 4,613,943 | 9/1986 | Miyake et al. | 901/42 |
| 4,831,235 | 5/1989 | Kishi et al. | 901/42 |
| 4,998,050 | 3/1991 | Nishiyama et al. | 901/42 |
| 5,166,491 | 11/1992 | Izume et al. | 219/110 |
| 5,449,875 | 9/1995 | Ito et al. | 901/42 |
| 5,493,093 | 2/1996 | Cecil | 219/110 |

*Primary Examiner*—Clifford C. Shaw
*Attorney, Agent, or Firm*—Staas & Halsey

[57] ABSTRACT

The present invention relates to a method of automatically assigning a single welding apparatus corresponding to a single robot, which is selected as a control object, in a welding robot system capable of controlling a plurality of robots and a plurality of welding apparatuses with a single control unit. The relations of correspondence between the robots and the welding apparatuses are first predetermined, and the predetermined relations of correspondence are stored in a memory of the control unit. When a single robot is designated through a teaching console panel for executing a given welding operation, the specific welding apparatus corresponding to the designated robot is automatically determined according to the relation of correspondence stored in the storage unit. As a result, the designated robot and the corresponding welding apparatus are started.

2 Claims, 2 Drawing Sheets

FIG. 2

```
ASSIGNMENT DESCRIPTIVE SCREEN (INTERLOCK SPOT WELDING APPARATUS) ////

1   GROUP OF INTERLOCKED APPARATUSES        EFFECTIVE

2   GROUP 1  (RB1)              WELDING APPARATUS  (WL)    3

3   GROUP 2  (RB2)              WELDING APPARATUS  (WL)    2

4   GROUP 3  (RB3)              WELDING APPARATUS  (WL)    1
```

METHOD OF ASSIGNING WELDING APPARATUSES IN WELDING ROBOT SYSTEM

BACKGROUND OF THE INVENTION

1. Field of the Invention

This invention relates to a method of assigning a single welding apparatus corresponding to a single robot selected as a control object in a welding robot system, wherein the welding robot system is capable of selectively controlling a plurality of robots and a plurality of welding apparatuses with a single control unit and executing predetermined welding operation with a combination of the single selected robot and the corresponding single welding apparatus.

2. Description of the Related Art

A space in facilities for welding operation can be utilized better, if a plurality of robots and a plurality of welding apparatuses are operated under control of a single control unit. However, in a conventional welding robot system, the plurality of robots and the plurality of welding apparatuses cannot be operated at a time by the single control unit (i.e., a single teaching console panel). Thus, a welding operation, a single robot suited for the welding operation to be started is initially selected as a control object, and a corresponding single welding apparatus is assigned.

Conventionally, the robot as a control object and the welding apparatus as an operating object have been individually selected by the user with manual operation. Thus, there has been a possibility that the user carelessly selects an inappropriate welding apparatus for assignment to the robot selected as the control object. As a result, the user might operate a wrong welding apparatus, which does not correspond to the robot selected as the control object without noticing that the incorrect welding apparatus has been specified, which sometimes may have caused hazardous accidents to the user.

OBJECTS AND SUMMARY OF THE INVENTION

It is an object of the present invention to provide a method of assigning welding apparatuses corresponding to robots, in which, when a single robot is designated by a teaching console panel, a welding apparatus corresponding to the designated robot is automatically designated according to the designation of the robot, in case where, for a robot which is selected as a control object, the welding apparatus to be associated with the robot has been specified in advance, in a welding robot system which is capable of controlling a plurality of robots and a plurality of welding apparatuses with a single control unit.

According to the method of the present invention, the relations of correspondence between robots and welding apparatuses are initially predetermined, and the predetermined relations of correspondence are stored in a storage means of a control unit. When one robot to be used for executing given welding operation is designated by a teaching console panel, a specific welding apparatus corresponding to the designated robot is automatically determined according to the relation of correspondence stored in the storage unit, and then the welding operation is started.

BRIEF DESCRIPTION OF THE DRAWINGS

The foregoing and other objects and features of the invention will become apparent from the following description of preferred embodiments of the invention with respect to the accompanying drawings, in which:

FIG. 2 is a view of a screen used for designating a welding apparatus assigned to each robot.

DETAILED DESCRIPTION OF THE PREFERRED EMBODIMENTS

Figure 1:
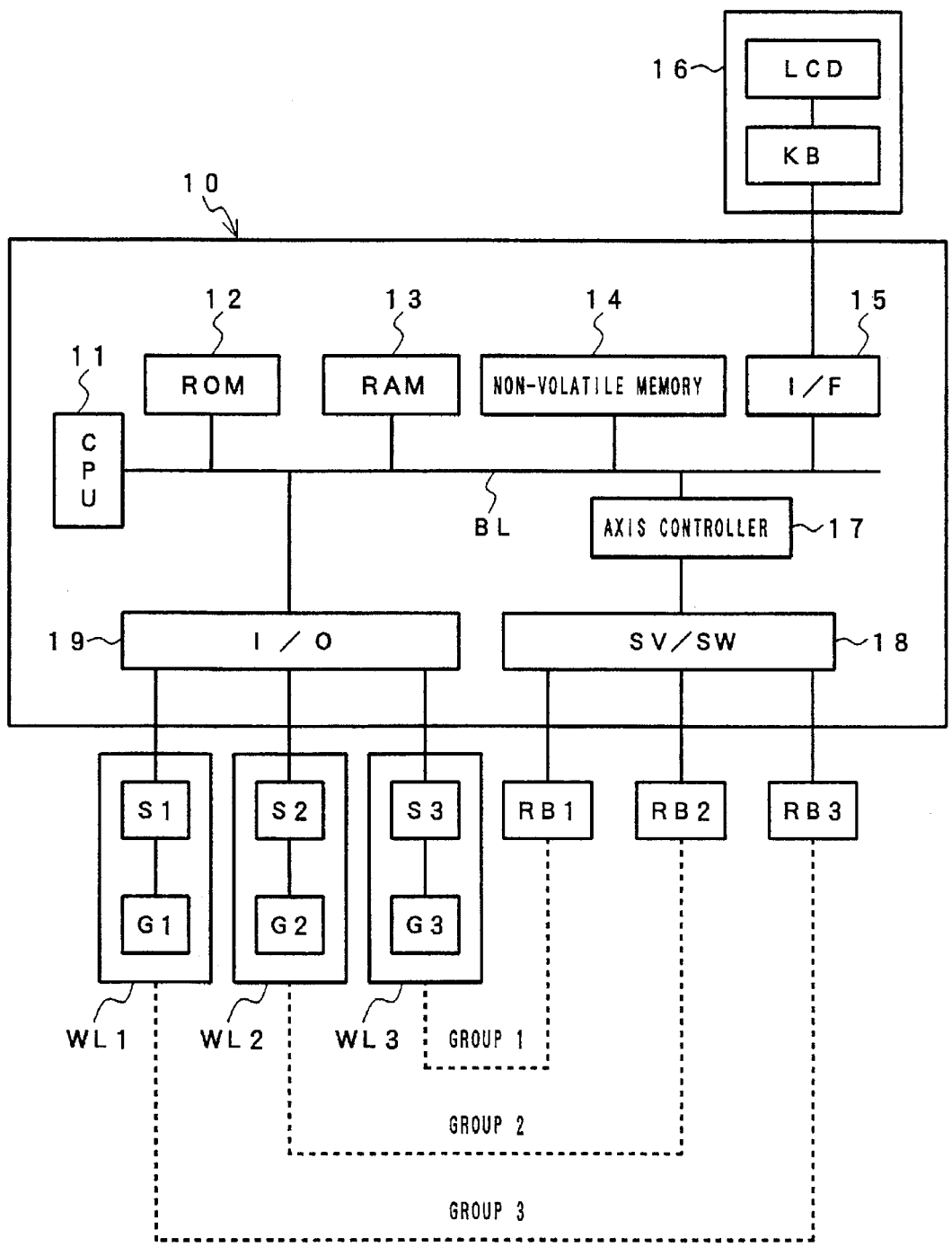
FIG. 1 is a block diagram showing the schematic configuration of a welding robot system applied to an embodiment of the present invention.

As shown in a block diagram of FIG. 1, a welding robot system comprises a control unit 10 to control the whole welding robot system, a teaching console panel 16 to designate contents of control by the control unit 10, and a plurality of (three) robots (body and operating units) RB1, RB2 and RB3 and a plurality of (three) welding apparatuses WL1 to WL3, which can be controlled by the control unit 10.

The control unit 10 includes a central processing unit (hereinafter referred to as CPU) 11. The CPU 11 is connected, through a bus line BL, to a memory 12 including a ROM, a memory 13 including a RAM, a non-volatile memory 14, a communication interface (communication port) 15, a robot axis controller 17 and an input/output unit (I/O) 19.

Three robots RB1, RB2 and RB3 are connected to the axis controller 17 through a servo/switching circuit (SV/SW) 18. The CPU 11 transmits a robot selection command to the servo/switching circuit (SV/SW) 18 through the axis controller 17. The circuit (SV/SW) 18, in response to received robot selection command supplies servo drive current to a specified one of the three robots RB1, RB2 and RB3 to bring the specified robot under control of the control unit 10.

On the other hand, individual welding power sources S1, S2 and S3 of the three welding apparatuses WL1, WL2 and WL3 are connected to the input/output unit (I/O) 19. The robot selection command from the CPU 11 makes a specified one of the welding power sources S1, S2 and S3 operate to supply welding voltage and welding current, which are designated by an operating program of the system, to one of welding guns G1, G2 and G3 in case of spot welding, or to one of welding torches in case of arc welding. The welding guns (or welding torches) G1, G2 and G3 may be supported by an arm distal end of one of the robots RB1, RB2 and RB3 or may be used as installed equipments without being supported by the robot (in case the robot supports a work, for instance).

The ROM 12 contains system programs to cause the CPU 11 to execute control of the robots RB1, RB2 and RB3, the welding power sources S1, S2 and S3 and the control unit 10 itself.

The RAM 13 is a memory which can be used for temporary storage and arithmetic operation of data. In the non-volatile memory 14, operating programs of the robots and set values of various parameter or the like are stored. The operating programs prescribe not only the operation of the robots RB1 to RB3, but also the operation of the welding power sources S1 to S3 (i.e., on/off operation, stroke operation, and welding voltage/welding current supply operation or the like). The operating programs are inputted from the teaching console panel 16 or an off-line programming unit (not shown).

The teaching console panel 16 is connected to the communication interface 15 of the control unit 10, and includes a liquid crystal display LCD and a keyboard KB. The teaching console panel 16 has the function of designating the robots and the welding apparatuses, and the function of giving various operating commands to the designated robot and welding apparatus. In addition, as will be described later, the teaching console panel 16 can be used for designating the welding apparatuses WL1, WL2 and WL3 to be combined with the respective robots RB1, RB2 and RB3. The contents of designation of the welding apparatuses by the keyboard KB are displayed on the display LCD and stored in a predetermined storage area of the non-volatile memory 14.

A description will now be given of a method of assigning a welding apparatus correspondingly to each robot using the welding robot system described above with reference to FIG. 1.

In this case, it is assumed that the welding apparatus WL3 is assigned to the robot RB1, the welding apparatus WL2 is assigned to the robot RB2 and the welding apparatus WL1 to the robot RB3.

Prior to the operation of the welding robot system, the welding apparatuses are assigned to the robots using the teaching console panel 16 attached to the control unit 10.

First the keyboard KB of the teaching console panel 16 is operated to display "assignment descriptive screen (interlock spot welding apparatus)" on the screen of a display LCD, as shown in FIG. 2.

Line numbers 1 to 4 are displayed on the leftmost column of the screen. On the first line, "group of interlocking apparatuses" is displayed. On each of the second and following lines, the name (i.e., number) of a group, to which a single robot belongs, is displayed. In the embodiment shown in FIG. 2, "Group 1 (RB1)" is displayed on the second line. In this case, "Group 1" represents the number of a group, to which the robot RB1 belongs.

Further, "Effective" is displayed in another column of the first line. On each of the second and following lines, there is shown a column to designate through manual input a welding apparatus, which is effectively operable in combination with a robot belonging to the group displayed on the same line. In the embodiment shown in FIG. 2, the column on the second line indicates that as the result of inputting "3" by the user, the welding apparatus No. 3 (i.e., WL3) can be assigned to the robot belonging to the group 1.

Then, when the user, while watching the screen, inputs "3" to the second line, "2" to the third line and "1" to the fourth line from the keyboard KB of the teaching console panel 16, as shown in FIG. 2, data representing one-to-one correspondence between the robots and the welding apparatuses (assignment data) as shown below is stored in the non-volatile memory 14 of the control unit.

Group 1: robot RB1—welding apparatus WL3
Group 2: robot RB2—welding apparatus WL2
Group 3: robot RB3—welding apparatus WL1

The welding apparatuses to be assigned to the corresponding robots are determined by the input through the screen. Thus, when executing the operation, the pertinent welding apparatus can automatically be selected according to the predetermined contents described above simply by designating the number of the group, to which the robot to be operated belongs. The group number is designated with the operation of the keyboard of the teaching console panel 16 or according to the operating programs. Then, when the group number is designated, the CPU 11 of the control unit 10 reads out the assignment data stored in the non-volatile memory 14, specifies the welding apparatus to be assigned to the robot belonging to the designated group, and sends out the selection command to the servo/switching circuit 18 and the input/output unit 19.

With the operation described above, a single robot (one of the robots RB1, RB2 and RB3) to be used for the welding operation of present time is combined with a welding apparatus. For example, when the group 3 is designated by operating the keyboard or according to the operating programs to execute the operation using the robot 3, the servo/switching circuit 18 is connected to the robot RB3, and the welding power source S1 of the welding apparatus WL1 is started or rendered to be ready for start. If the welding operation is started in this state, the welding operation by the combination of the robot RB3 and the welding apparatus WL1 will be executed.

Further, when the same or other operator switches over the robot in use from the robot RB3 to the robot RB1 for executing the welding operation, the teaching console panel may only be operated to designate the group 1 as a substitute for the group 3. This causes the connection of the robot RB3 to the welding apparatus WL1 to be automatically switched over to the connection of the robot RB1 to the welding apparatus WL3 in the input/output unit 19 of the control unit 10 according to the predetermined contents of setting described above, without the need of paying attention to the selection of the welding apparatus.

In the embodiment, a description has been given of a case where three robots and three welding apparatuses are provided. However, it is apparent that the present invention is applicable to the system using any number of robots and any number of welding apparatuses. Further, the number of robots is usually equal to that of welding apparatuses. However, insofar as the welding apparatus to be assigned to each robot is alternatively designated, the present invention is also applicable to a welding robot system including a combination of a single control unit, N sets of robots and M sets of welding apparatuses (provided that $N > M \geq 2$).

What is claimed is:

1. A method for assigning a welding apparatus in a welding robot system capable of controlling a plurality of robots and a plurality of welding apparatuses with a single control unit and for executing predetermined welding operation with a combination of a selected single robot and a corresponding single welding apparatus, comprising the steps of:

designating, from among the plurality of welding apparatuses, a single welding apparatus to be assigned to a single robot, which is selected from among the plurality of robots as a control object of the control unit, to store the contents of designation in a storage unit of the control unit; and bringing the single robot, which is actually selected among said plurality of robots as the control object of the control unit, under control of said control unit, while bringing the single welding apparatus, which is selected according to the contents of designation stored in said storage unit.

2. The method for assigning a welding apparatus in a welding robot system according to claim 1, wherein the welding apparatus to be assigned to each robot is designated using a display unit connected to said control unit.

* * * * *